A. H. SHERWOOD.
PROCESS OF SEPARATING METALS.
APPLICATION FILED SEPT. 24, 1913.
1,192,945.
Patented Aug. 1, 1916.
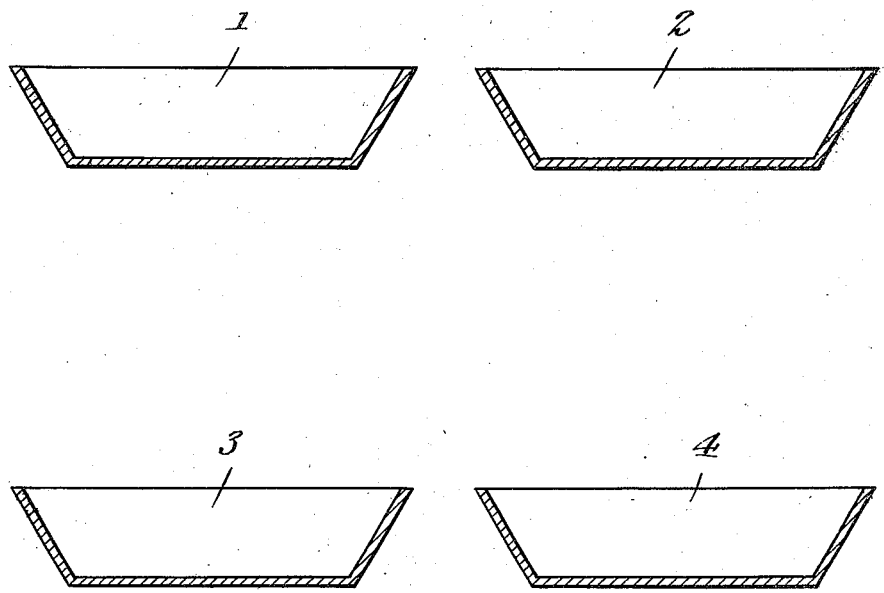
Witnesses
A. M. McCallum
C. C. Hines
Inventor
A. H. Sherwood
By Victor J. Evans
Attorney

UNITED STATES PATENT OFFICE.

ALBERT H. SHERWOOD, OF OROVILLE, CALIFORNIA.

PROCESS OF SEPARATING METALS.

1,192,945.  Specification of Letters Patent.  Patented Aug. 1, 1916.

Application filed September 24, 1913. Serial No. 791,646.

*To all whom it may concern:*

Be it known that I, ALBERT H. SHERWOOD, a citizen of the United States, residing at Oroville, in the county of Butte and State of California, have invented new and useful Improvements in Processes of Separating Metals, of which the following is a specification.

This invention relates to a process of treating pulp, black sand, concentrates and other refuse materials for the separation therefrom and recovery of precious metals, such as gold, platinum, palladium, osmium, iridium, ruthenium, rhodium, etc., the object of the invention being to provide a process of treatment whereby the recovery of a maximum amount of metals of the character described from even low grade material may be rapidly and economically performed.

The accompanying drawing shows conventionally certain instrumentalities used in the performance of the invention.

In carrying my invention into practice, the material to be treated, pulverized, fine or coarse as circumstances may require, is placed into a suitable receptacle, which may be termed receptacle number 1, that sulfuric acid will not attack. I then place within this receptacle a sufficient amount of sulfuric acid solution to saturate and cover the pulp, stir the mass so that the solution will thoroughly penetrate the same, and then allow the mass to stand for a period of from thirty to forty minutes. Under the action of the sulfuric acid solution, the pulp becomes puffy and light, and the gold, platinum and other metals are cleansed of their coating of oxids and other foreign matter. Under ordinary conditions I employ from sixteen to eighteen pounds of fifteen to twenty-five per cent. sulfuric acid solution, the strength depending on the absorbent nature of the pulp and whether or not iron is present. At the expiration of the period named, the sulfuric acid has not exhausted its strength and is adapted for further utilization in the course of treatment. Into the second receptacle, which may be termed receptacle number 2, and which may consist of a clean iron pan of proper size, I prepare an amalgamating bath consisting of about three and one-half pounds of 25% copper sulfate solution, one pound of copper sulfate crystals and from five to seven ounces of commercial quick silver or mercury. To these ingredients are added a few drops of sulfuric acid, when the ingredients are thoroughly rubbed together, the mercury uniting with the copper solution and forming a copper amalgam which adheres to the pan. The amalgamating bath having thus been prepared, the contents of receptacle 1 are transferred to receptacle or pan number 2, and the entire mass subjected to agitation for a period of about one hour, preferably by means of a suitable rotary stirrer, whatever copper crystals remaining undissolved in the amalgamating solution being dissolved by the sulfuric acid solution from the primary receptacle. As a result of the described method of treatment the copper solution penetrates the mass of pulp and coats the native metals, the sulfuric acid maintaining the pulp and minerals in condition for rapid amalgamation. After the mass has been agitated in the manner described for a period of about forty minutes, water is admitted slowly to the receptacle as the agitation continues and the native metals are washed out and carried off by specific gravity into contact with the copper amalgam and become amalgamated therewith.

When the process of amalgamation is thoroughly effected, the pulp and refuse are washed out from receptacle number 2 and the amalgam collected in a third receptacle, which may be termed receptacle number 3, and is subjected in said receptacle to the action of a 50% nitric acid solution, which takes up into solution the mercury, copper, lead and silver, leaving the gold, platinum, palladium, osmium, iridium, ruthenium, rhodium in the mass. The nitric acid is used until all action ceases, the time period of which depends on the amount of amalgam present. The solution is then washed off, and if iron is present with the metals remaining in receptacle number 3 it is removed by means of a magnet. To the contents of receptacle number 3 is then added a solution of cobalt nitrate, of 12% strength, which is allowed to stand for from five to ten minutes and to which is then added pure mercury, from one-half to one ounce of mercury to each four ounces of cobalt solution being used depending upon the amount of the gold present. The mercury takes up the gold extracted by the acid solution from the metals of the platinum group, together with the free gold extracted by the first amalgamating step, and the gold amalgam is poured off into a fourth receptacle, which may be termed receptacle number 4, into which is then introduced a sufficient amount of 50% nitric acid solution, which is allowed to remain until all action ceases. The mercury and cobalt are taken up by this solution, which is then washed off, platinum, palladium, osmium, iridium, ruthenium and rhodium thus being collected in receptacle number 3 and the gold in receptacle number 4.

I have found that in the ordinary processes of amalgamating gold, where the gold is associated with other precious metals of the platinum group, a large per cent. of the gold remains unextracted and left more or less alloyed with the metals of the platinum group, which must be subjected to further and expensive treatments for the separation of the gold and other metals from each other. I overcome this objection by my process of treatment, wherein a first amalgamating action is employed for extracting as much of the gold as possible, and separating from the mass all of the other metals except those of the platinum group, and leaving only such gold unextracted as remains associated with the platinum metals, which, however in many cases may amount to a considerable percentage. By then subjecting the gold which has not been separated by the first amalgamation to a second amalgamating action, using a solution of cobalt nitrate and mercury, the gold remaining unextracted from the metals of the platinum group is extracted, and upon then subjecting the amalgam to the action of a nitric acid solution the mercury is taken up by the solution, leaving the gold free for recovery. In this second amalgamating action extraction of the gold from the platinum metals may be effected, but very slowly and difficultly, through the use of mercury alone, but I have found that by employing the copper and cobalt in conjunction with the mercury any tendency of the mercury to flour is overcome, but a more important action is obtained in that the cobalt has a stimulating effect upon the mercury, preventing it from becoming sluggish and increasing its activity and amalgamating strength, by means of which the gold will be extracted from the platinum metals and a thorough amalgamation effected within a comparatively short period of time.

By means of the process described, both fine and coarse gold, as well as fine and coarse native metals of the platinum group, may be recovered in a rapid and expeditious manner, so that very low grade material may be treated with profit, the metals of the platinum group being separated and cleaned and sent to the refinery and the gold to the mint. It will, of course, be understood that while the proportions of the ingredients used are preferable, they may be varied as circumstances require, according to the quantity and condition of the iron, if any, in the pulp, and as circumstances may show to be advantageous in treating different kinds of pulp and refuse.

I claim:—

The herein described process of separating associated metals, such as gold, mercury, copper, lead, silver, and metals of the platinum group, which consists in subjecting the material to the action of a nitric acid solution until all action ceases, whereby the mercury, copper, lead and silver are separated from the mass and taken up into the solution, leaving the gold and metals of the platinum group remaining in the mass, then washing off the solution and subjecting the remaining mass to amalgamation with mercury in the presence of a solution of cobalt nitrate for the separation and amalgamation of the gold, then subjecting the gold amalgam to the action of a nitric acid solution for the separation therefrom of the mercury, and then washing off the solution.

In testimony whereof I affix my signature in presence of two witnesses.

ALBERT H. SHERWOOD.

Witnesses:
W. W. REECE,
W. H. DAVIS.